June 21, 1960 H. P. BOVENKERK 2,941,252
REACTION VESSEL
Filed March 20, 1957
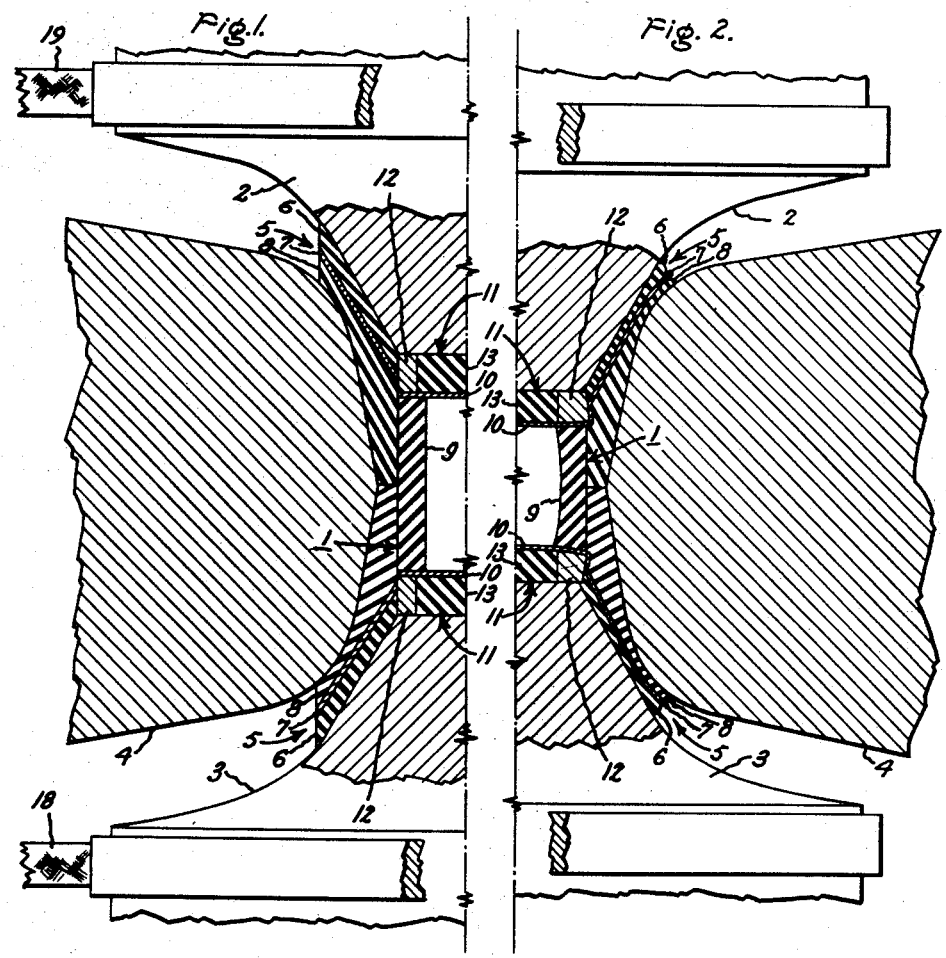
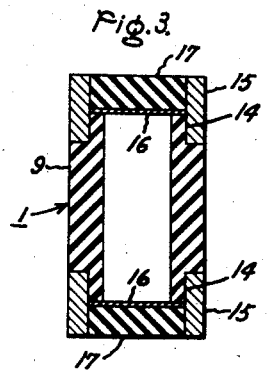
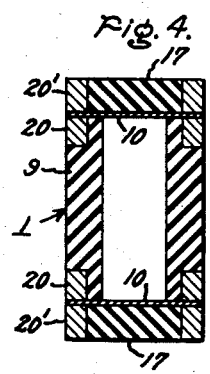
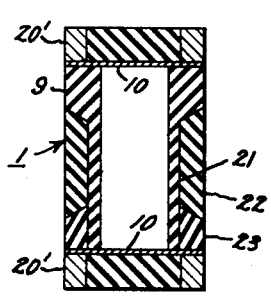
Inventor:
Harold P. Bovenkerk,
by Paul A. Frank
His Attorney.

United States Patent Office 2,941,252
Patented June 21, 1960

2,941,252
REACTION VESSEL

Harold P. Bovenkerk, Ballston Lake, N.Y., assignor to General Electric Company, a corporation of New York Filed Mar. 20, 1957, Ser. No. 647,425

13 Claims. (Cl. 18—34)

This invention relates to a reaction vessel utilized in high pressure high temperature apparatus for the study of, or to procure, various transformations or physical changes of state of innumerable materials, and more particularly, to an improved reaction vessel in which the change takes place.

A reaction vessel may be briefly described as one, containing a suitable specimen to undergo transformation, which is placed between the anvils of a press or other high pressure high temperature apparatus and subjected to high pressures and high temperatures to acquire a desired physical reaction or change of state. Included in the use of such a reaction vessel are the studies of various specimens of materials when subjected to high pressures and high temperatures and/or the chemical or physical changes of materials under such conditions, for example graphite to diamond. In this process, the vessel undergoes considerable crushing force together with a substantial reduction in size. The crushing force together with the resultant deformation leads to some pressure release through gaskets or the vessel itself, thus necessitating a longer stroke of the anvil and preventing reusability of the deformed parts. It is desirable to have not only as many parts as possible, relatively undeformed and suitable for reuse, but also to maintain the greatest amount of pressure in the vessel itself, or on those parts of the vessel which contribute to the high pressure on the specimen under consideration rather than to the related structure such as gaskets and the like.

Accordingly, it is an object of this invention to provide a more durable reaction vessel.

Another object of this invention is to provide a reaction vessel which transmits a larger pressure to the specimen than that obtainable in heretofore utilized vessels.

Yet another object of this invention is to provide a combination of materials in the reaction vessel which prevents substantial deformation of parts which may be reusable.

It is a further object of this invention to provide a reaction vessel which is resistant to pressure release and maintains a constant presssure for a given period of time.

It is still another object of this invention to provide a reaction vessel arranged for the employment of very hard, relatively incompressible materials for the relatively compressible materials heretofore employed.

Briefly described, this invention relates to an improved reaction vessel such as described and claimed in the copending application of Howard Tracy Hall, Serial No. 448,050, filed February 14, 1955, and assigned to the same assignee as the present invention, and in one form utilizes hard fired alumina in place of non-conducting materials, in combination with very hard additional rings at predetermined positions in the vessel to control reduction or deformation not contributing to the transfer of high pressures to the specimen in the vessel. In its broader form this invention includes the use of various thermally and electrically insulating refractory materials such as, for example, hard fired metal oxides concurrently with rings of hard metals such as steel, cemented tungsten carbide and the like, which minimize the danger of the rings and the refractory materials fracturing, and, accordingly, various parts of the vessel are rendered reusable.

This invention may be better understood when taken in connection with the following drawing and its scope will be pointed out in the appended claims.

Fig. 1 discloses in half-section a prior form of reaction vessel, together with a half-section of the essential parts of the high pressure apparatus;

Fig. 2 discloses a half-section of the reaction vessel of Fig. 1 after subjection to high pressures;

Fig. 3 shows the form of reaction vessel as utilized in this invention;

Fig. 4 shows a modified form of the present invention of Fig. 3; and

Fig. 5 shows an alternate form of this invention.

Referring now to Fig. 1, there is shown the reaction vessel 1 of this invention positioned in a high pressure apparatus. This high pressure apparatus, a description of which leads to a further understanding of this invention, forms no part of this invention, being described and claimed in the aforementioned copending application, Serial No. 448,050, of Howard Tracy Hall. Briefly described, the high pressure apparatus comprises one or more movable, oppositely mounted frustroconical or tapered anvils 2 and 3 coaxially encircled by a belt or band 4 of high strength cemented tungsten carbide or other suitable material for resisting the very high lateral forces imposed. The arrangement of the belt 4 and anvils 2 and 3 defines a central pressure chamber into which the vessel 1 is positioned. In order to seal the vessel 1 in the chamber, to prevent extrusion, and to have a sufficient stroke of the anvil to generate the very high pressures involved, a gasket assembly 5 is placed around vessel 1 and between the anvils 2 and 3 and belt 4. This gasket assembly 5 includes a pair of pyrophyllite, catlinite, or other electrically non-conductive frustroconical washers 6 on each of anvils 2 and 3, a pair of frustroconical metal washers 7 mounted on the washers 6, and a pair of frustroconical insulating washers 8 of catlinite, pyrophyllite, or other insulating material. The latter described frustroconical washers 8 extend from each punch or anvil 2 and 3 into the chamber to encircle the vessel 1. In the described chamber, these washers 8 are adjacent to the belt 4 and meet in abutting relationship with each other.

The reaction vessel 1 generally comprises a hollow cylinder 9 of catlinite, pyrophyllite, or other electrically non-conducting material which displays necessary characteristics for reaction vessels, such as permitting a substantial reduction in size without undue spalling. Into the hollow cylinder 9 there is placed an electrically conductive specimen which is the object of study or transformation at high pressures on the order of 110,000 atmospheres and temperatures of 0° C. to 3,000° C., or specimens which may undergo, when subjected to high temperatures and pressures, various physical or chemical changes which increase their densities and produce materials of additional characteristics, for example graphite to diamond. It may be appreciated that the particular specimen or the particular transformation forms no part of this invention, since the innumerable reactions and transformations are merely derivate of one's own discretion, need, or desire. A pair of flat metallic electrically conductive discs 10 are placed adjacent the end surface of the cylinder 9. In order to protect the anvils from the very high temperatures imposed, and to provide for suitable strength and equalized deforming characteristics, a cap assembly 11 is positioned adjacent the metallic discs 10 on each end of cylinder 9.

Cap assembly 11 comprises a relatively soft metal ring 12 and a disc or plug 13 of catlinite, pyrophyllite, or other non-conducting material. This combination, while performing satisfactorily, resulted not only in such a deformation of the assembly, as to render it non-reusable, but also deformed sufficiently to release some pressure and thus to require a relatively long stroke of the punch or anvil 2 or 3 to generate the required pressures. While it would at first appear that a higher strength ring material for ring 12 would prevent deformation, results have shown that such a procedure has very deleterious effects. Specifically, a very hard ring 12 together with the pyrophyllite plug 13 presents a highly unequal deforming surface such that ring 12 receives or has impressed thereon the greater portion of anvil force and tends to fracture in itself, or, in turn, to break the edges of the anvils 2 and 3. It may be seen, therefore, that a preferred form of this invention includes a ring 12 and a plug 13 of moderately equalizing deformation characteristics. When ring 12 and plug 13 are very hard and equivalently deforming, however, the deformation and/or altering of position when under pressure tends to permit a pressure release between the cap assembly 11 and the end surface of cylinder 9 and through gasket assembly 5.

In order to overcome the aforementioned problems, a reaction vessel of the type shown in Fig. 3 has been employed with good results. Referring to Fig. 3, the cylinder 9 includes a turned down or portion of reduced diameter 14 on each end face thereof. A ring of very hard electrically conductive metal 15, for example cemented tungsten carbide, is placed on each shoulder 14 such that the ring 15 extends beyond the end faces of cylinder 9. Within ring 15 and adjacent the end faces of cylinder 9 there is positioned on electrically conductive metallic disc 16 and a plug 17 of a material of lower compressibility than the material of the cylinder 9. Examples of materials which have proven satisfactory are hard fired metal oxides such as alumina or other suitable refractory metals which display thermal and electrical insulating characteristics.

The combination of the ring 15 and the plug 17, both as to structure and material, presents the desirable moderately equalizing deformation characteristics which in effect proportionately share the force imposed by the anvil without deforming to the extent of not being reusable. The rings 15 by encircling parts of cylinder 9 not only lend stability to the cap assembly 11 to minimize position alterations, but also encircle the heretofore break between the cap assembly 11 and the cylinder 9 to aid in the prevention of pressure release at this point. It may be seen from Fig. 2 that a ring 15 of relatively soft metal would, under pressure, tend to flare outwardly at the inner and lower portion to a position adjacent the belt 4 which would defeat the resistance heating circuitry employed in conjunction with the high pressure apparatus.

The circuitry for this apparatus may best be described with relation to Fig. 1 as follows. Current is conducted from a suitable source, not shown, to either the anvil 2 or 3 by means of conductor 18. From the anvil 3 the current flows through ring 12, disc 10, and thence to the electrically conductive specimen, where high temperatures are generated through resistance heating. The leaving path of current follows the reversed order as described, that is, from the specimen through disc 10, ring 12, the other anvil 2 and lead 19. To provide for resistance heating, the specimen within the vessel 1 is generally either originally electrically conductive or made so by the addition of electrically conductive materials. Alternatively, a suitable conducting sleeve may be placed around the specimen or a heater element inserted into the specimen. Various means for resistance heating the specimen are well known to those skilled in the art and thus form no part of this invention.

Other modifications may be employed to give the desired results, as illustrated in Figs. 4 and 5, without departing from the scope of this invention.

Referring now to Fig. 4, there is shown a modification of the invention of Fig. 3. This modification includes a pair of rings 20 and 20' for replacement of ring 15 of Fig. 3 and permits the use of disc 10 of Fig. 1 together with rings 20 and 20' of the same size as rings 12. The position of the inner rings 20 may be altered to an advantage without change of the cap assembly 11. It is to be noted that the employment of rings 15 of Fig. 3 and 20 and 20' of Fig. 4 not only contribute the desired strength to resist deformation, but also, by deforming less, act to direct the imposed pressure to the parts of the assembly which contribute most to the attainment of pressure on the specimen. The rings also may be considered generally as a dam to prevent pressure leakage through gasket assembly 11. Where it appears that the rings 15 or 20 may be projecting, after pressure imposition, closely adjacent belt 4, the modification of Fig. 5 may alternately be employed.

Referring now to Fig. 5, the cylinder 9 has an external narrow or reduced diameter portion 21. This reduced diameter portion contains a ring 22 of hard fired thermally and electrically insulating metal oxide which, together with the cylinder 9, forms a continuously smooth external surface. In Fig. 5 where the ring 22 need not be non-conducting, other suitable bands of high strength metals may be employed. For ease of assembly, cylinder 9 may have a reduced portion extending to one end, and ring 22 then placed over the reduced portion to be followed by placing thereover a ring 23 of the material of cylinder 9 to acquire the desired configuration. The use of ring 22 eliminates the need of ring 20 of Fig. 4, and contributes to the distribution of high pressure, thus lessening the deformation of the cap assembly 11. The ring 22 being a continuous ring, can develop sufficient tensile or hoop stress under high pressures to contain a part of the developed pressure in the reaction zone of the specimen. This prevents the belt 4 from being exposed to substantially all the pressure developed there, not only extending its life but also permitting a higher pressure to be developed.

Ring 22 in effect also acts as a dam to prevent pressure release through gasket assembly 5 by controlling the deformation of cylinder 9 such that a higher pressure is exerted between the ring 22 and cap 11 on the material of cylinder 9 to prevent pressure release therethrough.

It is a necessary feature of the overall assembly of parts in the high pressure apparatus that a certain amount of flow be necessary to achieve good gasket mounting and compressibility in the specimen. While pyrophyllite and catlinite are two of the more suitable materials for this purpose, only a limited amount of these materials may be replaced by more incompressible materials such as refractory materials including hard fired metal oxide, as herein described. It also has been found more satisfactory where the hard fired metal oxide is employed that it be employed in such geometrical forms as rings, bands, washers, and the like.

This improved reaction vessel cap assembly does not readily distort, has very low compressibility, and as compared to prior structures permits more of the stroke of the anvil to be used to apply pressure to the specimen. This combination when tested proved to give approximately 18% reduction in the required anvil force to develop a given satisfactory pressure.

While other modifications of this invention and variations of apparatus which may be employed within the scope of the invention have not been described, the invention is intended to include all such as may be embraced within the following claims.

What I claim as new and desire to secure by Letters Patent of the United States is:

1. A reaction vessel of predetermined compressibility and deformation characteristics comprising in combination, a hollow thermal and electrically insulating cylinder, an electrically conductive disc positioned coaxially on each end of said cylinder, a turned down diametrical portion on said cylinder, a ring of a material different from that of said cylinder filling said turned down portion, a pair of cap assemblies one positioned coaxially with and on each end of said cylinder adjacent said disc, said cap assemblies including an electrically conductive ring and a thermally and electrically insulating plug contained within the said ring, said electrically conductive ring being in contact with said electrically conductive disc, said cap assemblies being further characterized by employing, a material for said ring and material for said plug of substantially equal compressibilities, the material of said ring and the material of said plug being of less compressibility than the material of the said cylinder.

2. A reaction vessel of predetermined compressibility and deformation characteristics comprising in combination, a hollow thermally and electrically insulating cylinder, an electrically conductive disc closing each end of said cylinder, a pair of cap assemblies positioned coaxially adjacent each end of said cylinder on said disc, said cap assemblies including an electrically conductive ring in contact with said disc and a thermally and electrically insulating plug contained within said ring, the said cap assemblies being further characterized by employing materials for the parts thereof of substantially equal compressibility, each of which is of less compressibility than the material of the cylinder.

3. The invention as claimed in claim 2 wherein the plug of said cap assembly is a refractory metal oxide.

4. The invention as claimed in claim 2 wherein said cylinder is pyrophyllite.

5. The invention as claimed in claim 2 wherein the ring of said cap assembly is cemented tungsten carbide.

6. A reaction vessel comprising a hollow, non-conductive cylinder, a shoulder on at least one end of said cylinder, an electrically conductive cylinder on said shoulder, said conductive cylinder projecting beyond the end of said hollow, non-conductive cylinder, an electrically conductive disc within said electrically conductive cylinder and adjacent the end of and closing said non-conductive cylinder, and a thermally and electrically insulating refractory material plug within said electrically conductive cylinder and adjacent said disc, said plug and said conductive cylinder being of a lower compressibility than the material of the said non-conducting cylinder.

7. A hollow non-conductive pyrophyllite cylinder, a shoulder on each end of said cylinder, an electrically conductive hard metal cylinder on each of said shoulders, said conductive cylinders extending beyond the ends of said non-conductive cylinder, an electrically conducting disc within each of said electrically conductive cylinders and adjacent the ends of and closing said pyrophyllite cylinder, and a thermally and electrically insulating refractory metal oxide plug within said electrically conductive cylinders and adjacent said discs, said plugs and said hard metal conductive cylinders being of lower compressibility than pyrophyllite.

8. A reaction vessel comprising, a hollow, non-conductive cylinder, a shoulder on each end of said cylinder, an electrically conductive ring mouned on each of said shoulders, an electrically conductive disc adjacent said rings and said cylinder, an electrically conductive ring adjacent said discs, and a thermally and electrically insulating refractory material plug within each of said electrically conductive rings, said plug and said rings being of a lower compressibility than the material of said cylinder.

9. The invention as claimed in claim 8 wherein said plug is formed of a hard fired metal oxide, the cylinder of pyrophyllite, and the said electrically conductive rings are of hard metal.

10. A reaction vessel comprising a hollow, electrically non-conductive cylinder having an exterior reduced diameter portion, an annular ring of refractory material on said reduced portion, an annular non-conductive ring on said reduced portion adjacent said refractory material ring, an electrically conductive disc on each end of said cylinder, an electrically conductive ring adjacent each disc, and a non-conductive refractory material plug within said ring and adjacent said disc, said refractory ring and said refractory plug being of lower compressibility than the material of said non-conducting cylinder.

11. The invention as claimed in claim 10 wherein said refractory ring and said refractory disc are composed of a hard fired metal oxide of lower compressibility than the material of the said non-conductive cylinder, and said electrically conductive rings are of hard steel.

12. The invention as claimed in claim 11 wherein the said refractory ring is a metal of lower compressibility than said material of the said non-conductive cylinder.

13. A reaction vessel comprising, a hollow, non-conductive cylinder of pyrophyllite having an exterior reduced diameter portion, a thermally and electrically insulating refractory material ring on said reduced portion, a pyrophyllite ring on said reduced portion adjacent said refractory material ring, an electrically conductive metal disc adjacent each end of said cylinder, an electrically conductive hard steel ring adjacent said discs, and a refractory material plug in said ring adjacent said discs, said refractory ring and said refractory plug being of lower compressibility than pyrophyllite.

References Cited in the file of this patent

UNITED STATES PATENTS

| | | |
|---|---|---|
| 2,149,596 | Gillett et al. | Mar. 7, 1939 |
| 2,544,414 | Bridgman et al. | Mar. 6, 1951 |

OTHER REFERENCES

Bridgman: "Am. Acad. of Arts and Sciences," vol. 74, No. 2, pp. 16, 17, October 1940; No. 3, pp. 21–28 (October, 1940).

Bridgman: "J. Chem. Physics," vol. 15, No. 2, pp. 92–98 (February 1947).

Bridgman: "Review of Modern Physics," vol. 18, No. 1, pp 1–9, 25, 34, 79–88 (1946).

Baur et al.: "Zeitschrift fur Anorganische Chemie," vol. 92, pp 324–328 (1915).